United States Patent [19]

Benasutti

[11] 4,257,546
[45] Mar. 24, 1981

[54] TOOL FOR CLEAVING OPTICAL FIBERS

[75] Inventor: John E. Benasutti, Oil City, Pa.

[73] Assignee: GTE Products Corporation, Stamford, Conn.

[21] Appl. No.: 64,669

[22] Filed: Aug. 8, 1979

[51] Int. Cl.³ .............................................. C03B 33/06
[52] U.S. Cl. ........................................ 225/96.5; 225/2
[58] Field of Search ................ 225/2, 96.5; 65/2, 174, 65/87, 105, 112

[56] References Cited
U.S. PATENT DOCUMENTS

| | | | |
|---|---|---|---|
| 4,017,013 | 4/1977 | Hawk et al. | 225/96.5 |
| 4,039,309 | 8/1977 | Albanese et al. | 65/2 |
| 4,074,840 | 2/1978 | Fulenwider et al. | 225/96.5 |
| 4,154,385 | 5/1979 | Lewis | 225/2 X |
| 4,159,793 | 7/1979 | Belmonte et al. | 225/96.5 |

*Primary Examiner*—Frank T. Yost
*Attorney, Agent, or Firm*—Robert E. Walter

[57] ABSTRACT

A hand tool for cleaving optical fibers includes a means for supporting and tensioning an optical fiber, a lever pivotably mounted on the tool body for hand actuation, and means for severing an optical fiber including a cutting element operably associated with the lever for moving the cutting element toward and across the axial direction of an optical fiber.

4 Claims, 4 Drawing Figures

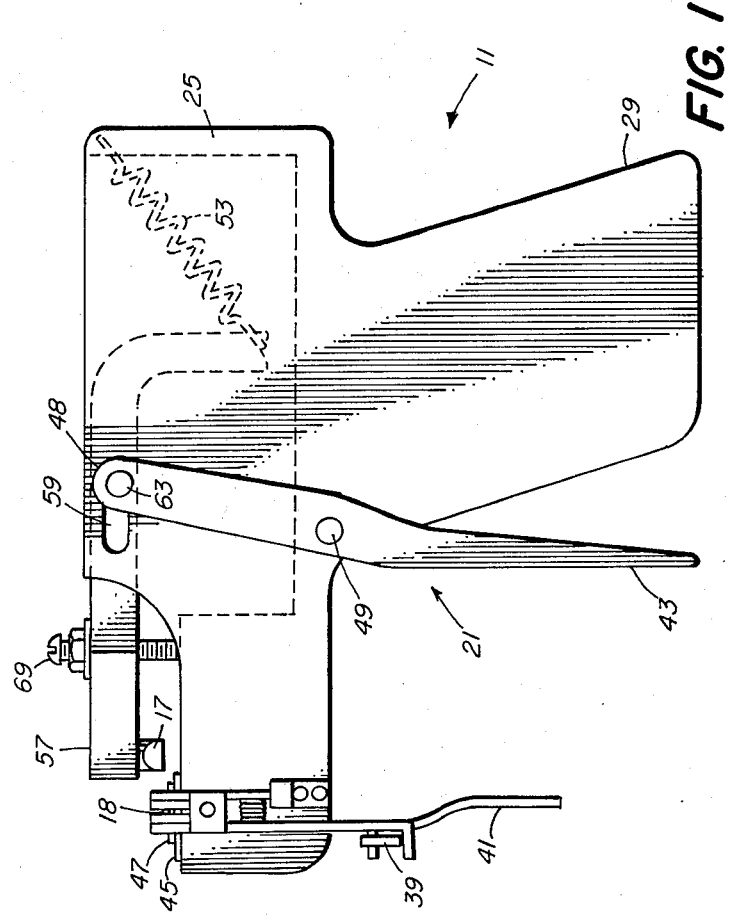
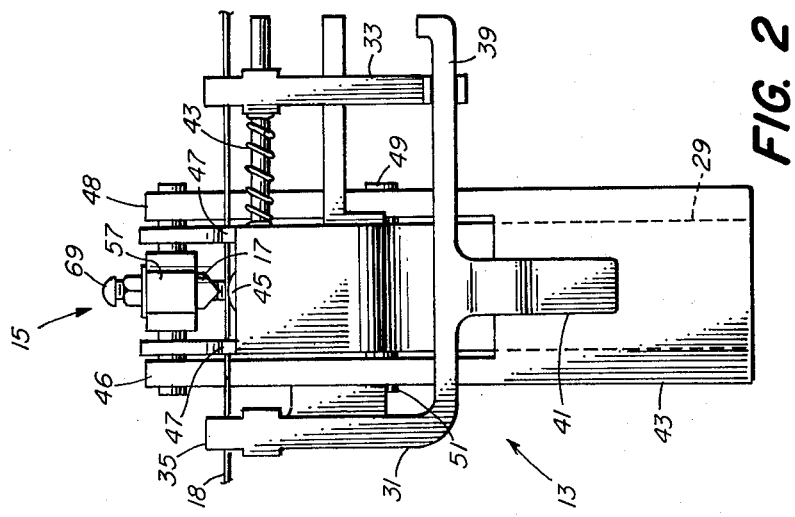

TOOL FOR CLEAVING OPTICAL FIBERS

This invention relates generally to optical fibers and more specifically to a tool for cleaving optical fibers.

There are many advantages to transmitting light energy via optical fiber wave guides and the use thereof is diverse. Single or multiple fiber wave guides may be used simply for transmitting visible light to a remote location. Complex communication systems may transmit multiple specific optical signals. These devices often require the coupling of fibers in end to end relationship with the coupling representing a source of light loss.

When placing optical fibers in end to end relationship to minimize light loss, it is desirable to have the end faces of the fibers be smooth and lie in a plane perpendicular to the axis of the fibers. If the ends of the fiber are uneven, excessive light loss can result due to reflection and refraction of light at the juncture region.

For field installation of optical fibers, it is particularly desirable to have a tool which can be simply and reliably used to properly cleave the fibers so as to minimize light loss when the fibers are subsequently junctioned.

SUMMARY OF THE INVENTION

There is provided a hand held tool for cleaving optical fibers comprising an elongated tool body having a longitudinal axis extending lengthwise thereof, means for supporting and tensioning an optical fiber along an axis transverse to the longitudinal axis, a lever pivotably mounted to said tool body with an end portion thereof adapted for hand actuation, means for severing an optical fiber including a cutting element positioned in proximity to said supporting and tensioning means, said severing means being operably associated with said lever for moving said cutting element in a direction toward and across the axial direction of an optical fiber when said lever is hand actuated.

The optical fiber cleaving tool of the present invention obviates many of the disadvantages found in prior art cleaving tools. The improved cleaving tool may be readily and conveniently used in field installation with little or no maintenance and minimal adjustments being required to repeatedly and effectively cleave fibers.

BRIEF DESCRIPTION OF THE DRAWINGS

The drawings which are descriptive of the preferred embodiment of the present invention are as follows:

FIG. 1 is a side elevational view of the cleaving tool;
FIG. 2 is an end elevational view of the cleaving tool.

DETAILED DESCRIPTION OF A PREFERRED EMBODIMENT

Figure 3:
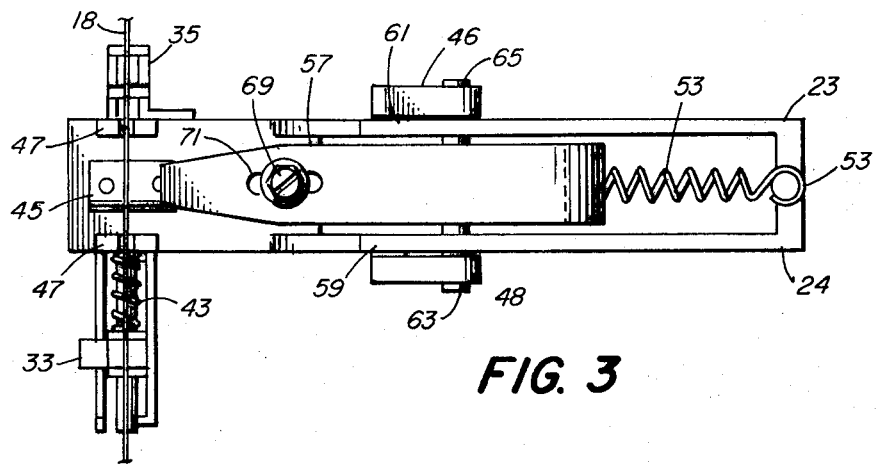
FIG. 3 is a top elevational view.
Figure 4:
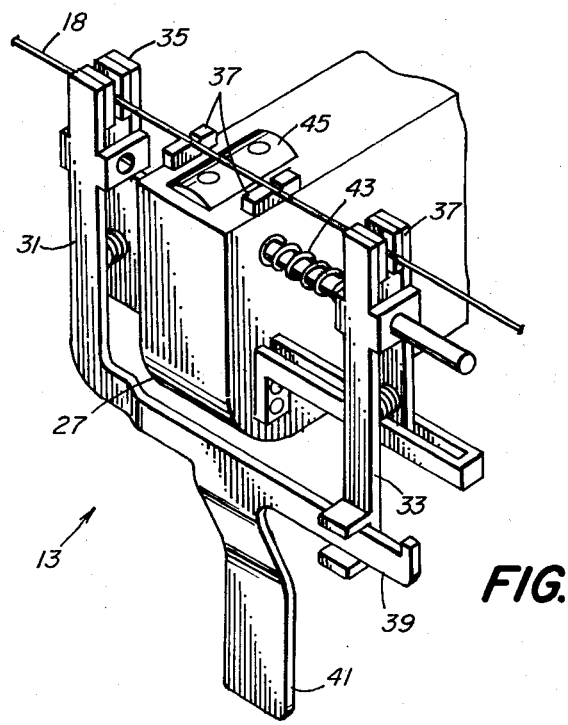
FIG. 4 is a partial perspective view.

As illustrated in FIG. 1, the cleaving tool generally comprises a tool body 11 including a means generally indicated at 13 for supporting and tensioning an optical fiber 18 in an axial direction. A means generally indicated at 15 includes a cutting element 17 and is operable for severing an optical fiber 18 when a lever 21 is actuated by an operator.

The tool body 11 has a generally elongated shape with a longitudinal axis extending lengthwise thereof. A pair of spaced lateral walls 23, 24 form a chamber in conjunction with an end wall 25 and a blunt nose 27. A depending handle 29 forms a pistol like grip.

The fiber supporting and tensioning means generally indicated at 13 includes a pair of clamps 31, 33 positioned on either side of the nose portion 27. Each of the clamps 31, 33 includes respective jaws 35, 37 for grippingly engaging an optical fiber 18. Clamp 33 is slideably mounted on frame 39 and resiliently biased away from clamp 31 by a spring 43 secured to the Clamp 33 at one end and the tool body 11 at the other end. A trigger 41 is operably connected to each of the clamps 31 and 33 so that actuation of the trigger 41 by movement toward the handle 29 causes the jaws 35, 37 which are normally biased in a close position to open. Releasing of the trigger 41 results in closing the jaws and clamping the fiber 18 in place along an axis transverse to the longitudinal axis of the tool body 11.

A back up member 45 is formed as a raised portion on the nose 27 of the tool body 11. Spaced notches 47 on the nose 27 are provided for assuring alignment of the optical fiber 18 along a substantially straight axis which is generally transversed to the tool body 11. With the fiber secured by clamps 31, 33 and held in tension thereby, the portion of the fiber 18 to be severed contacts the back up member 45 and is securely held against the downward thrust of cutting element 17. The jaws 35, 37 and notches 47 serve to hold the fiber 18 against the cleaving action of cutting element 17 which is in a direction normal to the axial direction of fiber 18.

Lever 21 is pivotably mounted at an intermediate position to tool body 11. One end of lever 21 forms a trigger portion 43 with respect to handle 29. A bifurcated portion having arms 48, 46 extend from the trigger portion 43. Each of the arms 48, 46 extend on either side of the tool body 11 and are mounted thereto by pins 49, 51 projecting from the body into bores of the respective arms 48, 46.

The severing means 15 includes an elongated member 57 pivotably mounted at an intermediate position to one end of lever 21. The elongated member 57 is generally positioned along the longitudinal axis of the tool body 11 and located widthwise between the lateral walls 23, 24 and lengthwise intermediate end wall 25 and nose portion 27. Mounting pins 63, 65 extend from the elongated member 57 through slots 59, 61 in respective lateral walls 23, 24. Pins 63, 65 engage respective arms 48, 46 so as to permit pivotable motion of the lever 21 with respect to the elongated member 57. Actuation of the trigger portion 43 of lever 21 back and forth toward and away from the handle results in the elongated member 57 moving back and forth in a direction substantially normal to the axis of the optical fiber 18 and corresponding to the longitudinal axis of the tool body 11.

The cutting element 17 is mounted at one end of the elongated member 57 so that a blade portion faces the backup member 45. The cutting element 17 is biased toward the fiber 18 to be cleaved by a resilient element in the form of a spring 53. As illustrated in detail in FIG. 1, the end of elongated member 57 is bent to project downwardly into the cavity between lateral walls 23, 24. Spring 53 is attached at one end to end wall 25 and the other end to elongated member 57 so that a counter clockwise torque is applied to elongated member 57 which tends to urge a cutting element 17 toward the fiber axis. The adjustable angularity of spring 53 mounting determines the downward force of cutting element 17. The elongated member 57 may include means for attaching one end of spring 53 to adjust the angularity. Slots 59, 61 limit the longitudinal movement of the elongated member 57 against the biasing force of spring 53.

The cutting element 17 is guided toward the optical fiber 18 in a direction toward and across the axial direction of the fiber 18. The tool body 11 includes a ramp 67 positioned intermediate the backup member 45 and the lever 21. The ramp 67 inclines upwardly away from fiber 18 along a direction corresponding to the longitudinal axis of the tool body 11. A ramp follower 69 is adjustably mounted to elongated member 57 intermediate the cutting element 17 and the pivotable mounting at pin 63, 65. The ramp follower 69 which protrudes downwardly from elongated member 57 is vertically and horizontally adjustable so that the angle of motion of the cutting element 17 can be varied. As illustrated in detail in the drawings, ramp follower 69 comprises a set screw and a locking nut. Due to the downward biasing of the cutting element 17, a forward movement of the elongated member 57 results in the ramp follower 69 sliding down ramp 67 to effect a cleaving action down and across the fiber 18. The specific angle of cut may be selected by the longitudinal adjustment of ramp follower 69 in slotted hole 71 so that the ramp follower 69 is positioned over a portion of the ramp 67 corresponding to the desired incline. As illustrated in FIG. 1, the ramp 67 has a curved shape with slope of the ramp 67 increasing as the distance away from the cutting element 17 increases. The variable slope of ramp 67 in a direction corresponding with longitudinal axis of the tool 11 together with the adjustability of the ramp follower 69 provides for selection of the angle of cut. Generally, as measured with respect to the longitudinal axis of the tool body 11, an angle of from about 5° to about 85° provides a sawing and/or chisel cleaving action respectively. The smaller angles provide more sawing action or movement across the fiber axis while larger angles provide more chiseling action or movement toward the fiber axis.

The fibers typically used for communication system have a silica core of one refractive index and a silica cladding of another generally lower refractive index. An additional outer coating is generally of a plastic material which protects the fiber from damage. After or prior to cleaving the fiber it is desirable to remove the outer coating by methods known in the art, for example, with a chemical solvent.

In operation, an operator squeezes the front trigger 41 so as to open jaws 35, 37 for receiving an optical fiber 18 to be cleaved. With clamp 33 moved toward the tool body 11 against the biasing force of spring 43, the optical fiber 18 is inserted into the clamps 31, 33 and trigger 41 is released to securely clamp the fiber in place. The fiber 18 may be adjusted to assure that it is resting firmly against back up member 45 and positioned in notches 47.

With the optical fiber 18 properly positioned, cleaving is effected by the operator merely squeezing trigger 43 toward handle 29. Actuation of trigger 43, results in elongated member 57 being moved forward against the biasing force of spring 53. Forward movement of the elongated member 57 causes ramp follower 69 to slide down ramp 67 so that cutting element 17 moves toward optical fiber 18 in a direction corresponding to the angle of the ramp 67. By using the cleaving tool of the present invention, the operator can be assured that the cutting action will be the same after many repetitions. The cutting action can be altered by adjusting the height and/or longitudinal position of the ramp follower 69 with the set screw. When severing optical fibers, it is desirable to control the depth and direction of the cut so that penetration of the fiber starts a line of fracture that is propergated throughout the fiber along a line of cleavage that is perpendicular to the axis of the fiber. Due to the tensioning of a fiber, the cut is readily propagated to form a smooth line of fracture perpendicualr to the fiber of the axis.

A preferred embodiment of the invention having been described and illustrated, it is to be realized that modifications thereof may be made without departing from the broad spirit and scope of this invention as described in the appended claims.

INDUSTRIAL APPLICABILITY

The present invention is directed to a hand held tool which may be utilized for cleaving optical fibers. The cleaved fibers are typically used in communications systems where they are installed in end to end relationship.

I claim:

1. A hand held tool for cleaving optical fibers comprising an elongated tool body having a longitudinal axis extending lengthwise thereof, means for supporting and tensioning an optical fiber along an axis transverse to the longitudinal axis, said fiber supporting and tensioning means includes a backing member, a pair of clamps, means for biasing said clamps away from each other so as to hold the fiber in tension, each clamp being positioned on either side of said backing member for holding a fiber in axial alignment in contact with said backing member, a lever pivotably mounted to said tool body with an end portion thereof adapted for hand actuation, means for severing an optical fiber including a cutting element, said severing means includes an elongated member pivotably mounted at intermediate position to the other end of said lever, said cutting element being mounted at one end of said elongated member, said severing means further including meams operably associated with said elongated member and adapted to bias said cutting element toward an optical fiber to be cleaved, and means for guiding said cutting element in a direction toward and across the axis of an optical fiber when said lever is actuated for cleaving optical fibers.

2. A hand held tool for cleaving optical fibers according to claim 1 wherein said guiding means includes a ramp inclined upwardly in a direction along the longitudinal axis and a ramp follower mounted to said elongated member intermediate said cutting element and said pivotable mounting of said elongated member.

3. A hand held tool for cleaving optical fibers according to claim 2 wherein said ramp follower is movable for adjusting the angle of motion of the cutting element.

4. A hand held tool for cleaving optical fibers according to claim 3 wherein said ramp has a variable slope along a direction corresponding with the longitudinal axis of the tool body.

* * * * *